UNITED STATES PATENT OFFICE.

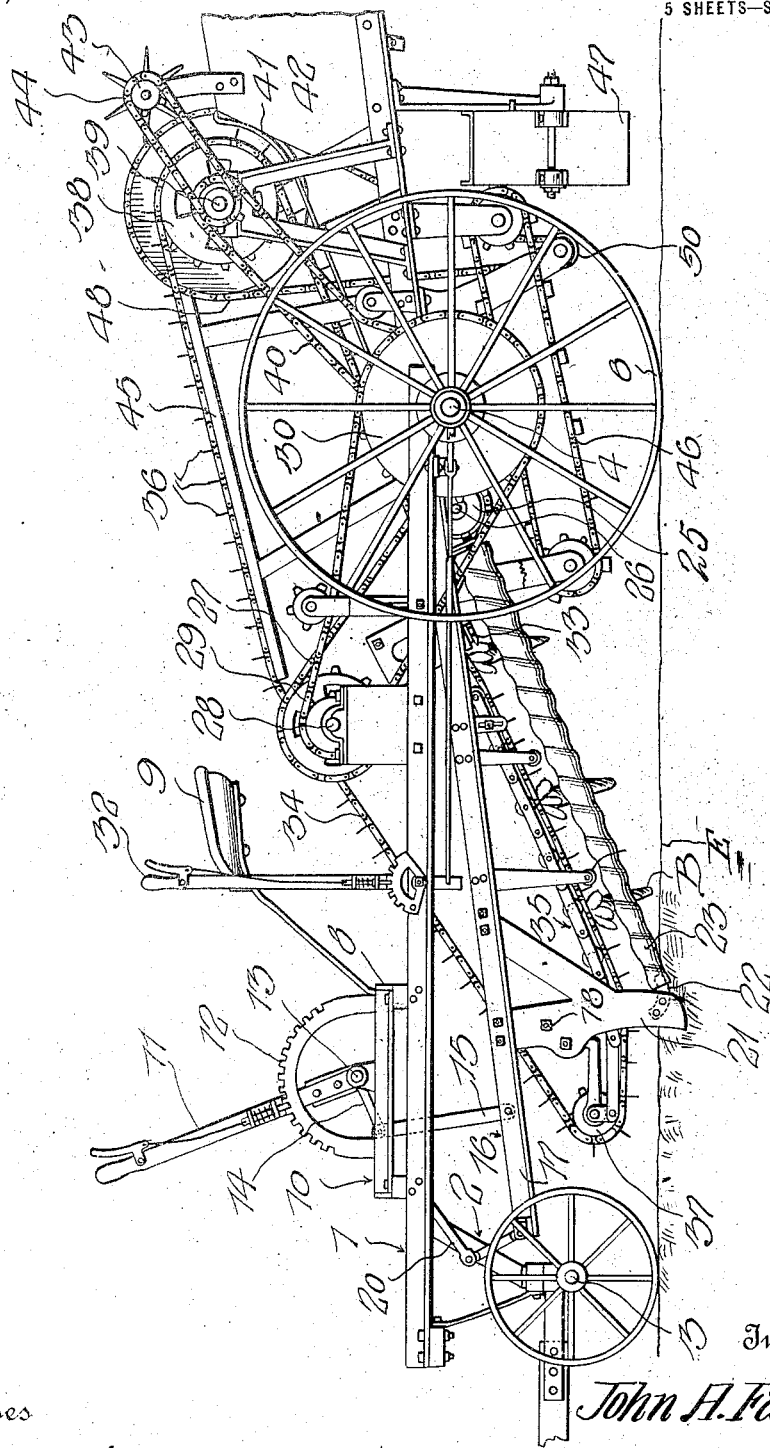

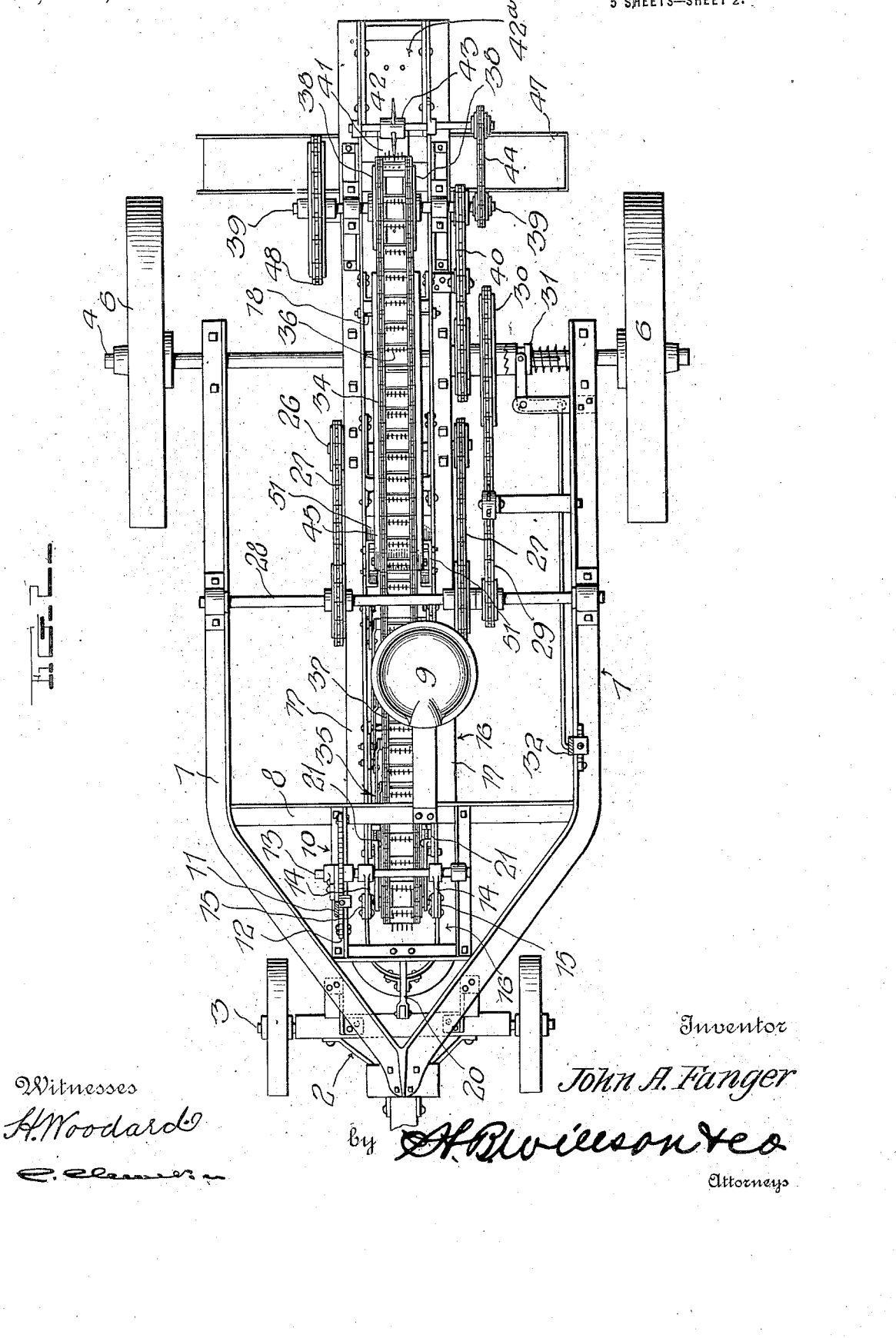

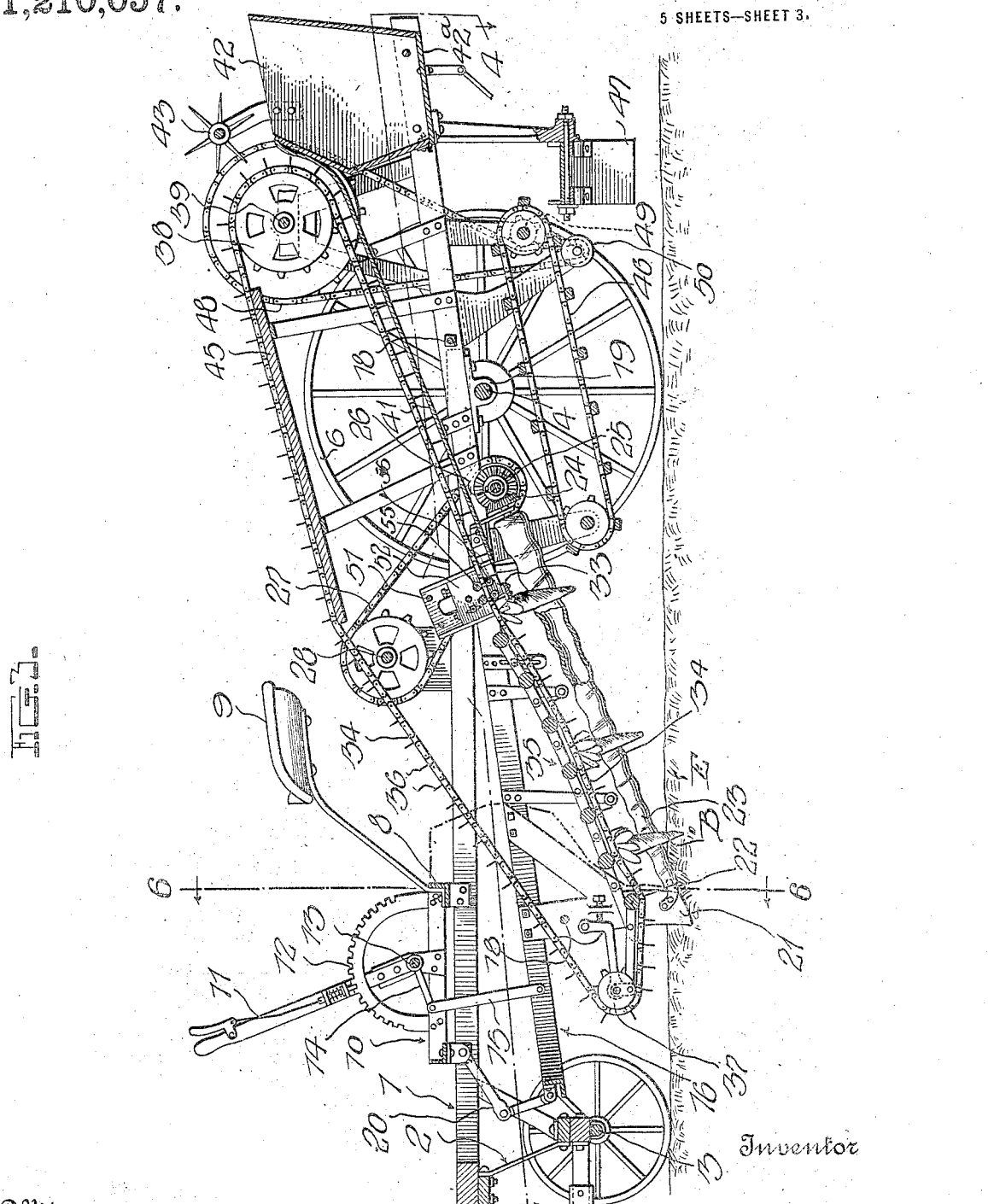

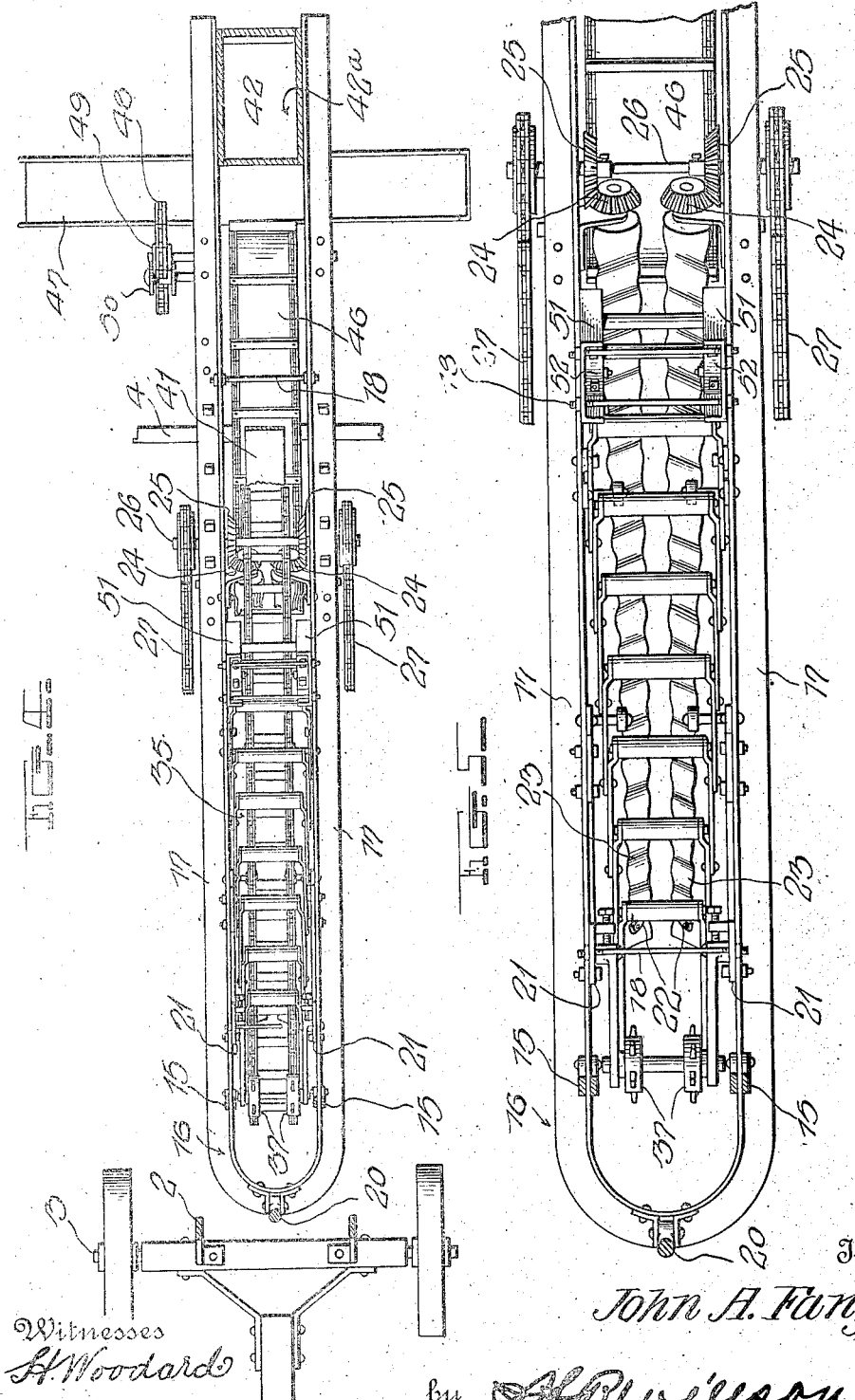

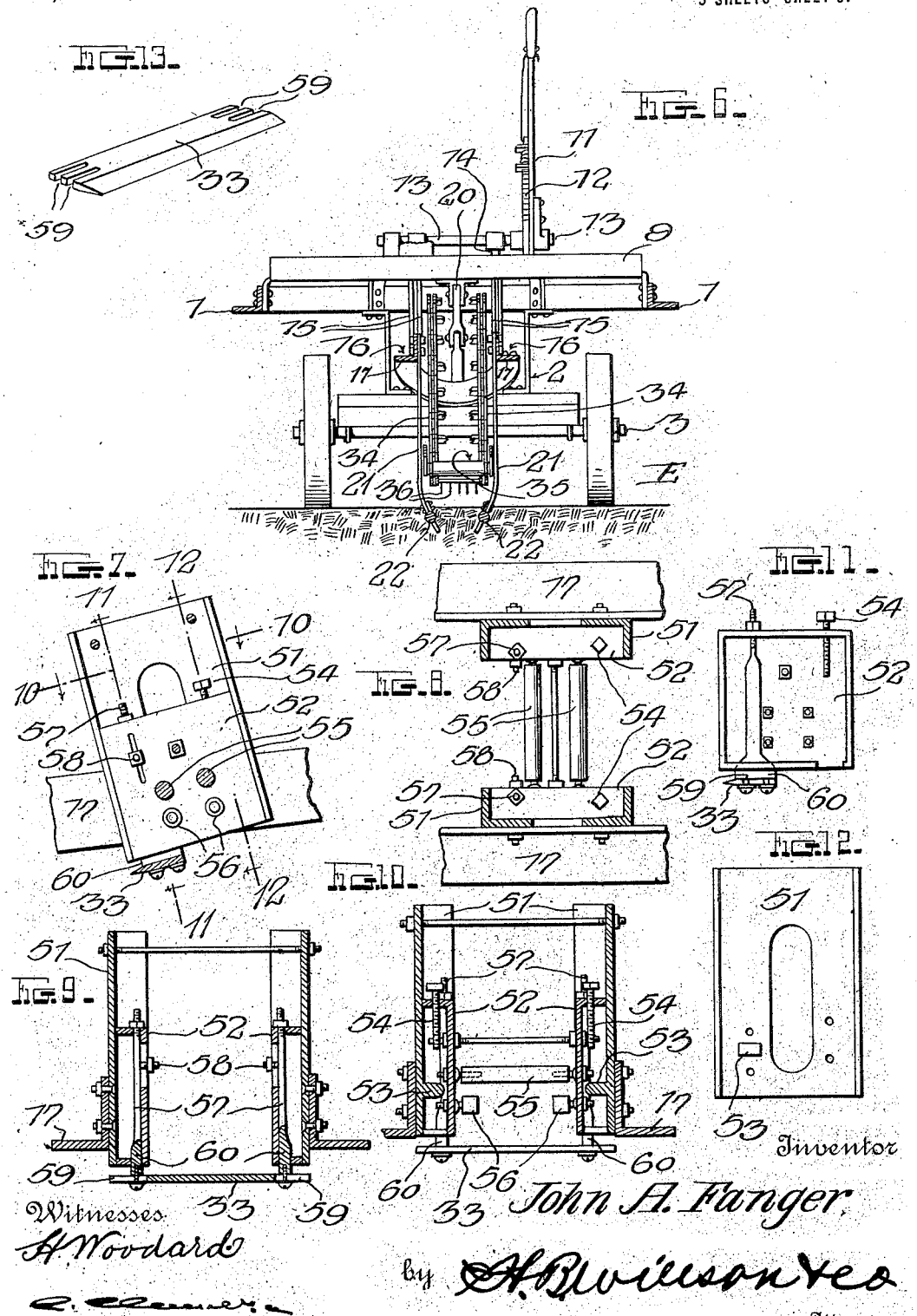

JOHN A. FANGER, OF KALIDA, OHIO; MARIA ANNA FANGER, EXECUTRIX OF SAID JOHN A. FANGER, DECEASED, ASSIGNOR, BY DIRECT AND MESNE ASSIGNMENTS, TO THE FANGER BEET HARVESTER CO.

BEET-HARVESTER.

1,210,057.      Specification of Letters Patent.      Patented Dec. 26, 1916.

Application filed April 26, 1915. Serial No. 24,079.

*To all whom it may concern:*

Be it known that I, JOHN A. FANGER, a citizen of the United States, residing at Kalida, in the county of Putnam and State of Ohio, have invented certain new and useful Improvements in Beet-Harvesters; and I do declare the following to be a full, clear, and exact description of the invention, such as will enable others skilled in the art to which it appertains to make and use the same.

My invention relates broadly to improvements in agricultural implements, and more particularly to beet harvesting machines.

The object of the invention is to improve upon the construction of devices of this class to the extent hereinafter described and particularly pointed out in the claims, the numerous features of construction employed being shown in detail in the accompanying drawings wherein like reference characters designate corresponding parts throughout the various views, and wherein:

Figure 1 is a side elevation of a beet harvester constructed in accordance with my invention; Fig. 2 is a top plan view thereof; Fig. 3 is a central vertical longitudinal section; Fig. 4 is a horizontal section as seen substantially along the line 4—4 of Fig. 3, parts being omitted for the sake of clearness; Fig. 5 is a view similar to Fig. 4, this view being constructed on an enlarged scale; Fig. 6, is a vertical transverse section as seen along the plane indicated by the line 6—6 of Fig. 3; Fig. 7 is a detail longitudinal section showing more particularly an inner side elevation of one of the knife guides and the carriage slidable vertically therein; Fig. 8 is a horizontal section as seen on the line 10—10 of Fig. 9; Figs. 9 and 10 are vertical transverse sections taken on the lines 11—11 and 12—12 of Fig. 9; Fig. 11 is an outer side view of one of the knife carriages; Fig. 12 is an inner side elevation of one of the carriage guides; Fig. 13 is a perspective view of the knife.

In these drawings, constituting a part of the application, the numeral 1 designates a main frame shown in the present application as comprising a pair of parallel side bars having forwardly converging front ends from which depends an appropriate frame-work 2 beneath which the front wheel supported axle 3 is mounted to swing horizontally, while the rear ends of the aforesaid bars of the frame 1 are provided on their under sides with appropriate bearings in which the rear driving axle 4 is rotatably mounted, this axle having drive wheels 6 on its opposite ends.

The frame 1, in addition to the parts so far described, includes a cross bar 8 upon which any preferred type of seat 9 is mounted, and in advance of which an additional frame 10 supporting a lever 11 and a locking rack 12 therefor, is provided.

The lever 11 is secured to a transverse rock shaft 13, thus allowing said shaft to be partially rotated to raise and lower a pair of forwardly extending crank arms 14 with which it is equipped, these arms 14 being pivoted to the upper ends of a pair of depending links 15 whose lower ends are pivoted in any appropriate manner to the forward end of a supplemental frame 16. This frame 16, as shown more particularly in Figs. 4 and 5, comprises a pair of longitudinal side bars 17 integrally connected at their front ends and also connected at suitably spaced points by transverse tie bolts 18, these bolts being of such length as to allow the two bars 17 to be forced away from each other or moved toward each other, according to the requirements of the machine. Although tie bolts 18 or equivalent adjusting means are preferably provided, it will be evident that the two side bars 17 could well be permanently connected to each other.

As clearly shown in Fig. 3, the side bars of the frame 16 are provided intermediate their ends, but near their rear ends, with bearings 19 which rotatably receive the rear axle 4, whereby when the crank arms 14 are raised or lowered by proper actuation of the lever 11, the entire supplemental frame 16 will be rocked around the axle 4, thus raising the forward end of said frame 16 to dispose the beet pulling mechanism carried thereby to inoperative position.

In conjunction with the hangers or links 15, I preferably provide a sectional link 20 whose upper and lower sections are connected by a rule joint or the like, while the upper and lower ends of said link are pivoted to the frames 10 and 16, in such a manner as to allow its two sections to swing forwardly and rearwardly, but to prevent such sections from swinging laterally. By so doing, lateral vibration of the front end of the frame 16 is reduced to a minimum.

Depending from the front ends of the side bars 17 of the frame 16, is a pair of upright plates 21 whose lower ends are turned inwardly as seen more particularly in Fig. 6 and constitute knives for slitting the earth E longitudinally on both sides of the rows of beets or other vegetables to be harvested. The lower ends of the plates 21, at the rear edges thereof, are provided with any preferred type of studs 22 received by the front ends of hollow worms 23 which are corrugated circumferentially both externally and internally and which incline upwardly and rearwardly from said studs and gradually increase in diameter from their front to their rear ends. The aforesaid rear ends of the worms 23 are rotatably mounted in any preferred type of bearings carried by the supplemental frame 16 and are provided with shafts having beveled gears 24 which intermesh with similar gears 25 carried by a transverse shaft 26, both ends of the latter being preferably driven by chains 27 or the equivalents thereof from a counter-shaft 28 mounted in suitable bearings rising from the side bars of the main frame 1, at the intermediate portion thereof. The shaft 28 is in turn driven by a chain 29 or the like, from a driving gear 30 running loosely upon one end portion of the axle 4 and capable of being locked thereto by a clutch 31 controlled by a lever or the like 32 from the driver's seat 9.

When the front end of the frame 16 is lowered to the necessary extent, the blades on the lower ends of plates 21 slit the earth longitudinally on both sides of the rows of beets and the contracted front ends of the worms 23 travel in such earth to an extent sufficient for allowing them to readily receive the beets B therebetween, whereupon said beets will be pulled from the ground and will be conveyed upwardly and rearwardly by the worms 23. During this upward and rearward movement of the beets, it becomes expedient to provide simple and efficient means for preventing removal thereof from the worms, and to likewise provide some efficient construction whereby the beets are held against tilting when brought into contact with a topping knife 33 disposed above the rear ends of the aforesaid worms.

In accomplishing the result previously stated to be desirable, an endless feed chain or belt 34 running over guide sprockets to be described is provided, one stretch of this chain being led upwardly and rearwardly from a point in advance of the worms 23 to a point above the rear ends of the side bars 16, and the forward portion of this stretch, or in other words, the portion thereof overlying the greater part of the worms 23, being normally weighted down by a weighted roller chain 35 which rests thereon. By this construction, prongs 36 with which the chain 34 is provided are forced into the tops of the beets B, whereupon as the lower stretch of the chain is fed rearwardly at the same speed with which the beets are moving rearwardly, the latter will be held against dislocation from the worms 23 and against tilting when they are forced into contact with the knife 33 for the purpose of severing their tops from their bodies.

It may here be explained that in order to allow only a predetermined amount of the upper ends of the beets to be severed therefrom, the knife 33 is so mounted as to allow it to move vertically, and provision is made whereby vertical movement of the lower stretch of the chain 34 will correctly position the knife for accomplishing the best results. The specific construction employed for this purpose will be hereinafter clearly described.

I have stated that the chain 34 is passed around a number of guide sprockets, and in the drawings have shown vertically adjustable front sprockets 37 around which said chain passes, and rear driven sprockets 38 which are keyed upon a transverse shaft 39 mounted upon standards rising from the rear end of the supplemental frame 16, said shaft being driven by a chain 40 or the equivalent thereof, from the hub of the gear 30. From a point disposed directly in rear of the cutting blade 33, the prongs 36 of the chain 34 travel over an inclined chute 41 which delivers into a hopper 42 carried by the frame 16, whereby the severed tops are conveyed to the end of the chute 41, at which point they are removed from the prongs 36 and deposited into the hopper 42 by a star wheel 43 here shown as driven by a chain 44 from the shaft 39.

Any preferred means may be provided for preventing slack in the chain 34, but in the present embodiment of the invention, I have shown an inclined platform 45 supported by legs from the supplemental frame, such platform being disposed beneath the rear portion of the upper stretch of said chain.

While the tops are being conveyed to the hopper 42, the beets proper are dropped upon an endless conveyer 46 which leads rearwardly from a point beneath the rear ends of the worms 23 and delivers into a transverse chute 47 capable of inclination toward either side of the machine. Although any desired means may be employed for driving the conveyer 46, this is preferably accomplished by the provision of a chain 48 leading around a sprocket keyed to the shaft 39, one stretch of said chain being engaged with a sprocket 49 secured to the rear shaft of the conveyer 46, the chain being shown in the present application as passed around an idler 50 disposed beneath the sprocket 49, whereby slack in the chain may be prevented.

In the foregoing, I have stated that the knife 33 is movable vertically with the lower stretch of the chain 34. For accomplishing this result in a very simple and efficient manner, a pair of channel-shaped guides 51 (see more particularly Figs. 7 to 12 inclusive) are secured by bolts or otherwise to the side bar 17 of the frame 16, at points spaced slightly in advance of the rear ends of the worms 23, such guides being provided for controlling the vertical movement of rectangular carriages 52 in the form of plates preferably having their rear sides hollowed out as shown in Figs. 11, 12 and 13. The downward movement of the carriages 52 is limited by the contact of fixed stops 53 carried by the guides 51 with adjustable set screws 54 threaded through the upper ends of said carriages.

Near their lower ends, the two oppositely disposed carriages 52 are connected by a pair of transversely disposed rollers 55 which contact with the upper side of the lower stretch of the chain 34, while at points below the rollers 55, shorter rollers 56 journaled on stub shafts carried by the carriages 52 underlie the edges of said chain to prevent relative movement of these parts, the rollers 56 being so disposed however, as to prevent contact with the prongs 36.

By the construction just described, it will be evident that as the lower stretch of the chain 34 is moved vertically by beets of different height, the knife 33 which is secured at its ends to the lower ends of the carriages 52, for vertical adjustment, will likewise be moved vertically, thus always properly positioning it for proper engagement with the beets, regardless of the height or length of the latter.

Although any preferred means could well be provided for adjusting the knife 33 vertically in respect to the carriages 52, upright bolts 57 are preferably disposed vertically through said carriages and equipped with nuts on their upper ends, their intermediate portions having threaded studs 58 projecting laterally through upright slots in the carriages and secured against movement in said slots by suitable lock nuts. It will thus be seen that when the lock nuts on the studs 58 are loosened and the nuts on the upper ends of the bolts 57 are adjusted, the blade 33 may be adjusted upwardly or downwardly, as the case may be, after which it may be locked in adjusted position by the aforesaid lock nuts.

As seen most clearly in Figs. 9, 11 and 13, the opposite ends of the blade 33 are provided with longitudinally disposed slots or notches 59 which receive screws or the like threaded into heads 60 formed on the lower ends of the bolts 57. By this detail of construction, it will be evident that if the side bars 17 of the frame 16 are adjusted toward or away from each other, these screws may be loosened and moved within the slots 59, thus affording a different space between the carriages and exposing more or less cutting area of the knife, as the case may be.

The operation of a machine constructed in accordance with the illustration and preceding description, or manufactured in a similar manner, is as follows: The entire machine is drawn forwardly by draft animals or by a tractor so as to straddle the row of beets being pulled. The lever 11 is now actuated to force the curved lower ends of the plates 21 into the earth, thus slitting the same along both sides of the row. Needless to say, depression of the frame 16 likewise forces the reduced lower ends of the feed worms 23 into the earth, whereupon the beets loosened by plates 21 will be conveyed upwardly and rearwardly by said worms. Before the beets are received by the worms 23, however, the prongs 36 of the chain 34 are forced into the tops thereof, the weighted chain 35 now retaining such prongs in this position to feed the tops of the beets rearwardly uniformly with the bodies thereof. If a particularly large beet is being raised, when the same reaches the knife 33, it will project a considerable distance above the worms 23 as shown in Fig. 3, whereupon the chain 34 will be raised at this point, thus raising the knife carriages and the knife, the latter now severing the top of the beet from the body thereof in the manner previously set forth. The tops are now conveyed rearwardly upon the chute 41 and removed from the prongs 36 by the star wheel 43, whereupon they are deposited into the hopper 42 from which they may be discharged from time to time by opening the hinged bottom 42ª of said hopper. This may be done in any preferred manner from the driver's seat. In the meantime, the beets proper are conveyed to the rear ends of the feed screws 23 and are deposited therefrom on to the endless conveyer 46, the latter now delivering said beets to the chute 47 from which they slide to one side of the machine.

The illustration in the accompanying drawings may well be considered as one unit of a beet harvesting machine of the class described, since any number of these units may be disposed side by side for pulling more than one row of beets at one trip across the field. Since this construction is practically duplication of that shown, however, further illustration or description is not deemed necessary.

From the foregoing description, when taken in connection with the drawings, it will be evident that not only a very simple machine has been provided for the attainment of the desired results, but that such machine will possess a number of highly advantageous features. Particular emphasis is laid upon the coacting chains 34 and 35, the mountings for such chains, the specific formation of the feed screws 23, the novel relation between the feed chain 34 and the knife 33, and upon the tilting chute 47.

In the drawings, I have shown certain specific details for accomplishing probably the best results, and in the foregoing have described such details. It will be evident, however, that I need not be limited thereto otherwise than to the extent to which the appended claims limit me.

I claim:

1. In combination, a portable frame, a pair of spaced upright guides carried thereby, vertically movable knife carriages on said guides, a vertically adjustable knife secured to said carriages, belt guides carried by the carriages, and a feed belt having a vertically movable stretch passing through said guides.

2. In combination, a portable frame, a pair of upright guides carried thereby and movable toward and away from each other, knife carriages slidable vertically on said guides, a knife having slidable normally locked connections at its ends with said carriages, belt guides carried by the carriages, and a feed belt having a vertically movable portion received by said belt guides.

3. In combination, a portable frame, a pair of upright guides carried thereby and movable toward and away from each other, a pair of knife carriages slidable vertically on the guides, a knife having slots at its ends, fasteners passing through said slots into the carriages, belt guides carried by the carriages, and a feed belt having a vertically movable portion received by said guides.

4. In combination, a portable frame, a pair of upright carriage guides carried thereby, a pair of vertically movable carriages disposed on said guides, vertically adjustable upright bolts carried by the carriages and having heads, a knife secured at its ends to said heads, belt guides carried by the two carriages, and a feed belt having a vertically movable portion received by said belt guides.

5. In combination, a portable frame, a vertically movable vertically slotted knife carriage carried thereby and having belt guides, an upright vertically adjustable bolt carried by the knife carriage and having a nut for adjusting it vertically, a stud projecting laterally from the bolt through the slot in the carriage, a lock nut on said stud, a knife secured to the bolt, and a feed belt having a vertically movable portion received by the aforesaid belt guides.

6. In combination, a portable frame, an upright guideway carried thereby and having a stop, a vertically movable knife carriage disposed in the guideway and having a stop coacting with the stop thereon to limit the downward movement of said carriage, belt guides carried by the carriage, and an endless feed belt having a vertically movable portion received by said guides.

7. In combination, a portable frame, a vertically slidable knife carriage carried thereby, adjustable stop means for limiting the movement of said carriage, a knife carried by the latter, belt guides likewise carried thereby, and a feed belt having a vertically movable portion received by said guides.

8. In combination, a portable frame, an upright guide carried thereby and having a fixed stop, a knife carriage movable vertically along said guide, a knife carried by said carriage, a set screw likewise carried thereby and disposed in the path of the aforesaid stop, belt guides carried by the carriage, and a feed belt having a vertically movable portion received by said guides.

In testimony whereof I have hereunto set my hand in presence of two subscribing witnesses.

JOHN A. FANGER.

Witnesses:
Geo. W. Wiseley,
H. M. Jay.